United States Patent
Vilermo et al.

(10) Patent No.: US 11,809,641 B2
(45) Date of Patent: Nov. 7, 2023

(54) ORIENTATION OF VISUAL CONTENT RENDERED ON A DISPLAY OF A MOBILE DEVICE

(71) Applicant: Nokia Technologies Oy, Espoo (FI)

(72) Inventors: Miikka Tapani Vilermo, Siuro (FI); Arto Juhani Lehtiniemi, Lempäälä (FI); Anssi Sakari Rämö, Tampere (FI); Toni Mäkinen, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 61 days.

(21) Appl. No.: 17/580,307

(22) Filed: Jan. 20, 2022

(65) Prior Publication Data

US 2022/0253154 A1    Aug. 11, 2022

(30) Foreign Application Priority Data

Feb. 5, 2021 (FI) .................................. 20215126

(51) Int. Cl.
*G06F 3/0346* (2013.01)
*G06F 3/14* (2006.01)

(52) U.S. Cl.
CPC .............. *G06F 3/0346* (2013.01); *G06F 3/14* (2013.01)

(58) Field of Classification Search
CPC .................................. G06F 3/0346; G06F 3/14
USPC .......... 345/633, 649, 659; 455/418; 702/176
See application file for complete search history.

(56) References Cited

U.S. PATENT DOCUMENTS

| | | |
|---|---|---|
| 2005/0168399 A1 | 8/2005 | Palmquist |
| 2012/0176413 A1* | 7/2012 | Kulik ............... G06F 1/1694 345/659 |
| 2013/0038634 A1 | 2/2013 | Yamada et al. |
| 2013/0344859 A1* | 12/2013 | Abramson ........ H04M 1/72463 455/418 |
| 2015/0205379 A1 | 7/2015 | Mag et al. |
| 2015/0341536 A1 | 11/2015 | Huang et al. |
| 2016/0018225 A1* | 1/2016 | Yang ................. G01C 21/16 702/176 |
| 2017/0053623 A1* | 2/2017 | Purayil ............... G06T 15/005 |
| 2017/0279957 A1* | 9/2017 | Abramson et al. ..... G06F 21/36 |
| 2020/0066236 A1 | 2/2020 | Giusti et al. |
| 2020/0104033 A1 | 4/2020 | Ho et al. |
| 2020/0150836 A1 | 5/2020 | Penha et al. |
| 2020/0228645 A1* | 7/2020 | Alberth, Jr. .......... G01C 21/206 |

FOREIGN PATENT DOCUMENTS

EP    3136201 A1    3/2017

OTHER PUBLICATIONS

Cheng et al., "IRotate: Automatic screen rotation based on face orientation", Proceedings of the SIGCHI Conference on Human Factors in Computing Systems, May 2012, pp. 2203-2210.

(Continued)

*Primary Examiner* — Prabodh M Dharia
(74) *Attorney, Agent, or Firm* — Harrington & Smith

(57) ABSTRACT

A method comprising determining that an orientation of a mobile device is a flat orientation, determining a context of the mobile device, determining movement of the mobile device, and based on the orientation, context and movement of the device, determining orientation of visual content rendered on a display of the mobile device.

16 Claims, 6 Drawing Sheets

(56) References Cited

OTHER PUBLICATIONS

European Application No. EP 21156520.5, "An Apparatus, A Method and a Computer Program for Rotating Displayed Visual Information", filed on Feb. 11, 2021, pp. 1-35.
Chen et al., "Orientation Optimization for Full-View Coverage Using Rotatable Camera Sensors", IEEE Internet of Things Journal, vol. 6, No. 6, Dec. 2019, pp. 10508-10518.
Office action received for corresponding Finnish Patent Application No. 20215126, dated May 7, 2021, 9 pages.
Extended European Search Report received for corresponding European Patent Application No. 22153360.7, dated Jun. 15, 2022, 9 pages.

* cited by examiner

ORIENTATION OF VISUAL CONTENT RENDERED ON A DISPLAY OF A MOBILE DEVICE

FIELD

The present application relates to rendering visual content on a display of a mobile device.

BACKGROUND

Mobile devices are prone to various movements that may turn the mobile device such that the visual content rendered on the display is no longer suitable in terms of user's field of view. Various sensors may be used to determine for example the orientation of the device and based on information obtained from the sensors, orientation of the rendered visual content may be updated. Yet, the updated orientation of the rendered visual content may not always result in an optimal user experience.

BRIEF DESCRIPTION

The scope of protection sought for various embodiments is set out by the independent claims. The exemplary embodiments and features, if any, described in this specification that do not fall under the scope of the independent claims are to be interpreted as examples useful for understanding various embodiments of the invention.

According to an aspect there is provided an apparatus comprising means for determining that an orientation of a mobile device is a flat orientation, determining a context of the mobile device, determining movement of the mobile device, and based on the orientation, context and movement of the device, determining orientation of visual content rendered on a display of the mobile device.

According to another aspect there is provided an apparatus comprising at least one processor, and at least one memory including a computer program code, wherein the at least one memory and the computer program code are configured, with the at least one processor, to cause the apparatus to determine that an orientation of a mobile device is a flat orientation, determine a context of the mobile device, determine movement of the mobile device, and based on the orientation, context and movement of the device, determine orientation of visual content rendered on a display of the mobile device.

According to another aspect there is provided a method comprising determining that an orientation of a mobile device is a flat orientation, determining a context of the mobile device, determining movement of the mobile device, and based on the orientation, context and movement of the device, determining orientation of visual content rendered on a display of the mobile device.

According to another aspect there is provided a computer program comprising instructions for causing an apparatus to perform at least the following: determine that an orientation of a mobile device is a flat orientation, determine a context of the mobile device, determine movement of the mobile device, and based on the orientation, context and movement of the device, determine orientation of visual content rendered on a display of the mobile device.

According to another aspect there is provided a computer program product comprising instructions for causing an apparatus to perform at least the following: determine that an orientation of a mobile device is a flat orientation, determine a context of the mobile device, determine movement of the mobile device, and based on the orientation, context and movement of the device, determine orientation of visual content rendered on a display of the mobile device.

According to another aspect there is provided a computer program comprising instructions stored thereon for performing at least the following: determine that an orientation of a mobile device is a flat orientation, determine a context of the mobile device, determine movement of the mobile device, and based on the orientation, context and movement of the device, determine orientation of visual content rendered on a display of the mobile device.

According to another aspect there is provided a non-transitory computer readable medium comprising program instructions for causing an apparatus to perform at least the following: determine that an orientation of a mobile device is a flat orientation, determine a context of the mobile device, determine movement of the mobile device, and based on the orientation, context and movement of the device, determine orientation of visual content rendered on a display of the mobile device.

According to another aspect there is provided non-transitory computer readable medium comprising program instructions stored thereon for performing at least the following: determine that an orientation of a mobile device is a flat orientation, determine a context of the mobile device, determine movement of the mobile device, and based on the orientation, context and movement of the device, determine orientation of visual content rendered on a display of the mobile device.

DETAILED DESCRIPTION

Figure 1A:
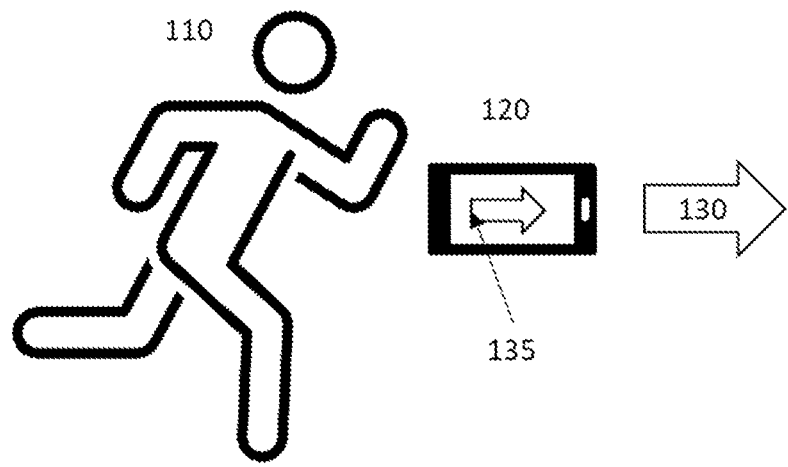
FIGS. 1A and 1B illustrate an exemplary embodiment of determining orientation for visual content to be rendered.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

As used herein, the term "determining" (and grammatical variants thereof) can include, not least: calculating, computing, processing, deriving, measuring, investigating, looking up (e.g., looking up in a table, a database or another data structure), ascertaining and the like. Also, "determining" can include receiving (e.g., receiving information), accessing (e.g., accessing data in a memory), obtaining and the like. Also, "determining" can include resolving, selecting, choosing, establishing, and the like.

Mobile devices, such as mobile phones, wearable devices, cameras or tablet computers, are often carried by a user in various activities during which the orientation of the device may change rather often. For example, if the user is running, on a train or riding a bicycle, the user may at the same time interact with the mobile device and the mobile device consequently moves along the movement of the user. To ensure a good user experience, the mobile device may utilize input from one or more sensors, such as a gyroscope and/or an accelerometer, it comprises and/or is connected to, to determine an optimal orientation for visual content rendered on the display of the device. If the visual content is deemed to be upside down, for example, by the user, the user experience suffers which is not desirable. Orientation of visual content rendered on a display of a mobile device may be determined based on for example the direction of a gravity such that the lower part of the visual content is aligned to be towards the direction of the gravity. The direction of the gravity may be obtained for example based on input received from an accelerometer. However, if the mobile device is in a flat orientation, the direction of the gravity may not be useful anymore with regard to determining the orientation of the visual content to be rendered.

If the mobile device has a flat orientation, which may be understood as the display of the mobile device to be facing upwards or downwards such that the device is at least substantially orthogonal to the gravity, then a camera may be used to detect the face of the user. Based on the face of the user, the orientation of the visual content to be rendered on the display of the mobile device may be determined such the user experience is optimal. Yet, if the user is lying down or there are multiple faces recognized, the mobile device may not be able to recognize the face of the user such that it can determine the optimal orientation for the visual content that is to be rendered. Further, the face of the user may not be visible in a dark environment, the face of the user may not be recognized by the mobile device if the user is wearing a face mask, etc.

If a mobile device therefore is oriented in a flat orientation, the optimal orientation for the visual content to be rendered on a display of the mobile device may need to be determined based on other input. In some exemplary embodiments, if it is determined, based for example input from one or more sensors, that the mobile device is oriented in a flat orientation, movement of the mobile device may also be determined and, based at least partly on the determined movement of the mobile device, orientation of the visual content to be rendered on the display of the mobile device is determined. Movement of the mobile device may be understood to cover movements and trajectories of the mobile device and/or indication regarding if the mobile device is still. Movement and trajectories may be determined, for example, by using methods such as Global Positioning System (GPS), High Accuracy Indoor Positioning (HAIP), Ultra WideBand (UWB) based positioning, positioning systems based on one or more cameras, accelerometers etc. or any combination thereof. For example, if it is determined that the orientation of the mobile device is a flat orientation, then the movement of the mobile device may be determined and visual content may be rendered on the display of the mobile device may be oriented based, at least partly, on the determined movement of the mobile device. For example, the upper part of the visual content may be aligned with the direction of the movement of the mobile device. Additionally, a context of the mobile device may further be determined, and the orientation of the visual content rendered on the display of the terminal device may further be based on the determined context of the mobile device. The context of the mobile device may be understood as activity of the mobile device and/or activity in which the mobile device is involved. For example, an activity of the mobile device may be understood as an application being active and/or the mobile device having one or more active connections to adjacent devices. Further, activity in which the mobile device is involved may be understood for example as the user performing an activity such as passing on the device to another person, running or cycling, and the activity of the user is detected by the terminal device.

Figure 1B:
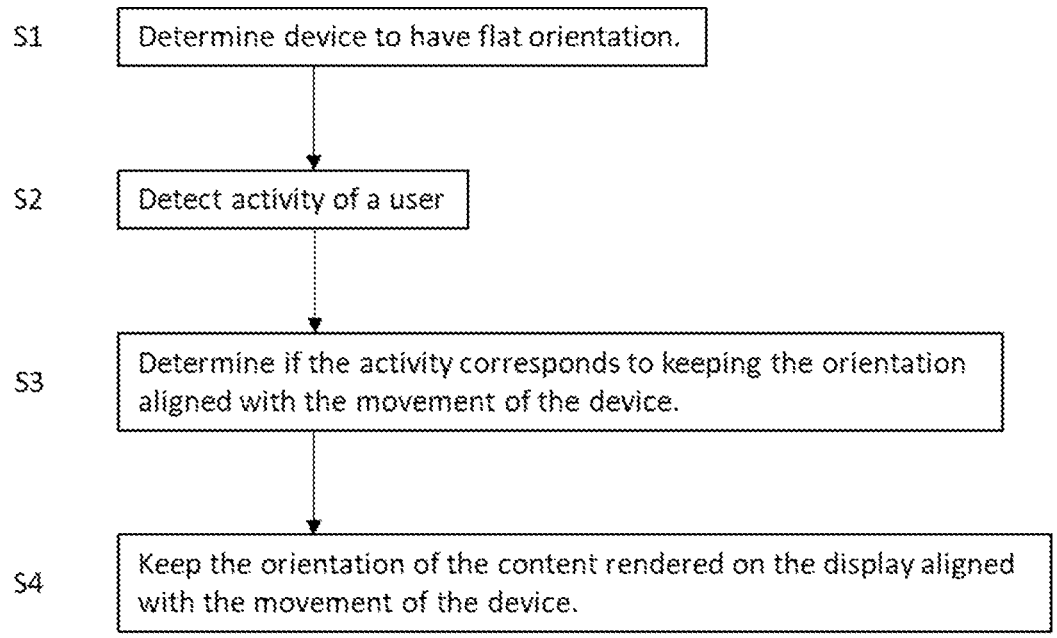

FIGS. 1A and 1B illustrate an exemplary embodiment of aligning the orientation of the visual content rendered on the display of the mobile device. In FIG. 1A, a user 110 is running and is also using his mobile device 120 at the same time. Thus, in this exemplary embodiment, the context of the mobile device 120 is an activity of the user, that is, the movement of the user. The direction of the movement of the mobile device, which in this exemplary embodiment corresponds to the direction of the movement of the user 110, is illustrated by the arrow 130. In this exemplary embodiment the activity of the user, that is, the context of the mobile device 120, is determined by the mobile device based, at least partly, on input received from one or more accelerometers comprised in the mobile device. Additionally or alternatively, input from other sensors may be utilized as well to determine the activity of the user. Further additionally or alternatively, a user activity setting in an application such as an activity tracking application may be utilized to determine the activity of the user. The determined activity may further be determined to be such that the user 110 is expected to keep focus towards the front direction of the user, which is also the direction of the movement of the mobile device 120. As the orientation of the mobile device is further determined to be a flat orientation, the orientation of the content rendered 135 on the display of the mobile device is aligned with the direction of the movement of the mobile device 120. The aligned orientation of the content rendered 135 on the display of the mobile device is, in this exemplary embodiment, such that the upper part of the visual content rendered is in the direction of the movement of the mobile device 130.

This aligned orientation is then fixed for the duration of the activity. In other words, the orientation of the visual content rendered on the display of the mobile device is kept fixed for as long as the context is determined to be valid. In other words, for as long as the activity of the user continues. Once the activity of the user is determined to be different, it may be determined that the context of the mobile device is no longer valid. Alternatively or additionally, the context may be determined not to be valid if the orientation of the device is determined to be other than a flat orientation.

FIG. 1B illustrates a flow chart according to the exemplary embodiment of FIG. 1A. First in S1 an orientation of a mobile device is determined to be a flat orientation. Then in S2 the mobile device determines its context. In this exemplary embodiment, the context is determined based on detecting an activity of the user. In this exemplary embodiment, the activity of the user comprises movement of the user. Next, in S3, it is determined if the activity of the user corresponds to keeping the orientation aligned with the movement of the device. If yes, then in S4 the orientation of the content rendered on the display is kept aligned with the movement of the mobile device.

Figure 2A:
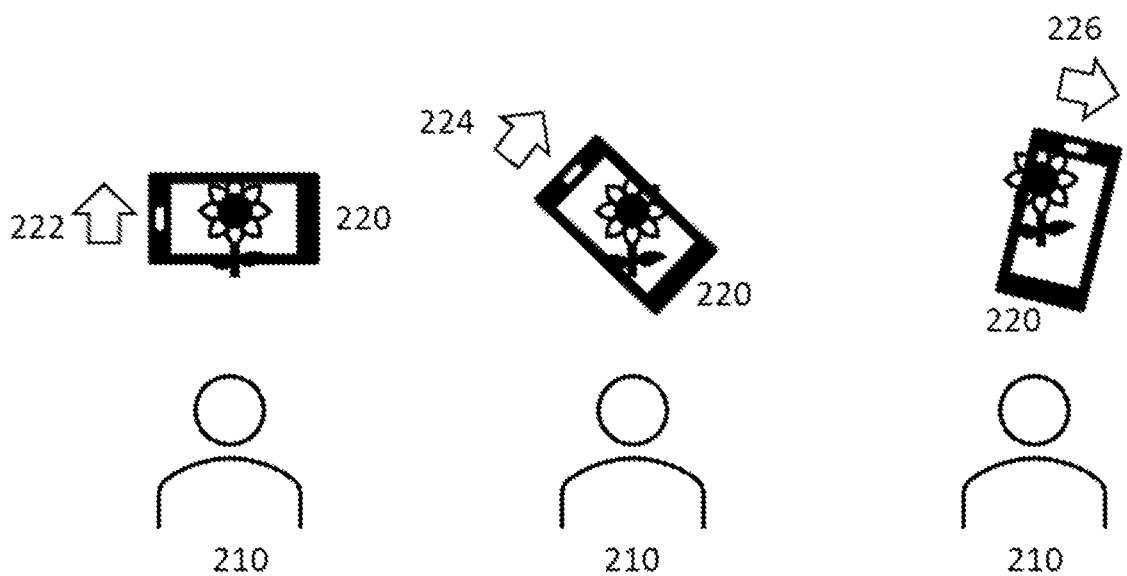
FIGS. 2A and 2B illustrate another exemplary embodiment of determining orientation for visual content to be rendered.
Figure 2B:
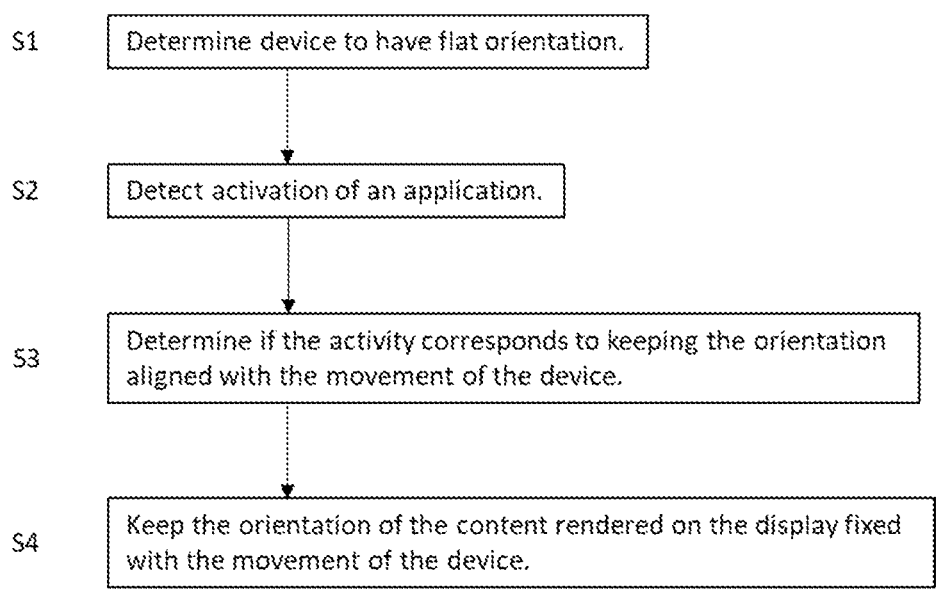

FIGS. 2A and 2B illustrate another exemplary embodiment of determining an orientation of visual content rendered on a display of a mobile device 220. In this exemplary embodiment, a user 210 is using a mobile device 220 and activating an application that requires the user to point the mobile device 220 towards an object that in this exemplary embodiment is a flower but in some other exemplary embodiments the object could be a person or a bar code for example. For example, the user 210 sees the flower and decides to take a picture of the flower. In this exemplary embodiment, the flower is knee high so the user 210 has the mobile device 220 such that its orientation is a flat orientation. The mobile device 220 determines that its orientation is flat orientation. As the user 210 decides to take a picture of the flower, the user activates the camera application of the mobile device 220. In other words, the context of the mobile device 220 may be determined as the mobile device being involved in a user activity based, at least partly, on the application activated. As the user 210 activates the camera application, the user 210 then points the mobile device 220 towards the flower and towards the end of the pointing movement the user 210 decides whether the picture is to be a portrait or a landscape picture. For the visual content rendered on the display of the mobile device 220 as the user decides if the picture is to be a landscape or a portrait picture the orientation should be kept fixed such that it is not aligned with the movement of the mobile device 220 after the pointing movement as such is completed. In other words, once the orientation of the mobile device 220 is a flat orientation.

Thus, once it is determined that the context of the mobile device 220 is such that it is involved in an activity of a user and once it is determined that the orientation of the mobile device 220 is a flat orientation, the visual content rendered on the display of the mobile device 220 is oriented such that it remains fixed despite the movement of the mobile device 220. In this exemplary embodiment, direction of the movement of the mobile device 220 is illustrated by the arrows 222, 224 and 226. Yet, the orientation of the visual content rendered on the display of the mobile device 220 is optimally rendered when it is fixed despite the movement of the mobile device.

Although camera was mentioned in this exemplary embodiment, it is to be noted that the orientation of the visual content rendered on the display of the mobile device 220, once the mobile device 220 is in a flat orientation, is determined to be fixed despite the movement of the mobile device 220, this approach could also be used with other applications such as meeting audio recorder, journalist interview audio recorder or bar code reader. In other words, orientation of the visual content rendered on the display of the mobile device 220 is determined based on the context of the mobile device and the flat orientation of the mobile device 220. The movement of the mobile device 220 may be considered to also be a factor in a sense that the orientation is to be aligned along the end point of the movement of the mobile device 220 that took place prior to detecting the flat orientation of the mobile device 220, after which the orientation of the visual content rendered on the display of the mobile device 220 is kept fixed until the orientation of the display device is no longer flat and/or the context of the mobile device 220 is no longer valid. That is, until the application is no longer active.

FIG. 2B illustrates a flow chart according to the exemplary embodiment of FIG. 2A. In this exemplary embodiment, in S1, it is determined that the orientation of the mobile device is a flat orientation. Next, in S2 the context of the mobile device is determined, which comprises determining that an application is activated and that the application is such that the mobile device is determined to be involved in user activity. Next, in S3, movement of the device, which in this exemplary embodiment is the movement of the device right after the application is activated that may be the first detected movement after the application is activated, is determined and orientation of visual content rendered on the display of the device is aligned with the movement of the mobile device. Alternatively, if no clear movement is detected after the application has been activated, the movement of the mobile device may be determined to be end of the movement prior to activating the application. That is the end of the last movement before the application was activated. The orientation of the visual content rendered on the display is then aligned with the determined direction of the movement of the terminal device. Aligning the visual content may be understood as the upper part of the visual content being in the direction of the movement of the mobile device. Finally, in S4 the aligned orientation of the visual content rendered on the display of the mobile device is kept fixed until the orientation of the mobile device is no longer flat and/or the application is no longer active.

In general, applications such as camera, bar code reader, QR code reader, matrix barcode reader, meeting audio recorder and/or interview audio recorder may require a user to point a mobile device towards an object. In these applications, the user may activate the application after which he makes a move towards the object/person. The movement right after application has been activated may be detected based on for example accelerometers. Since the first movement may take the mobile device from a view direction of the user towards the direction of the object, the movement may be interpreted as revealing the optimal display rotation while the user is using the application.

Figure 3A:
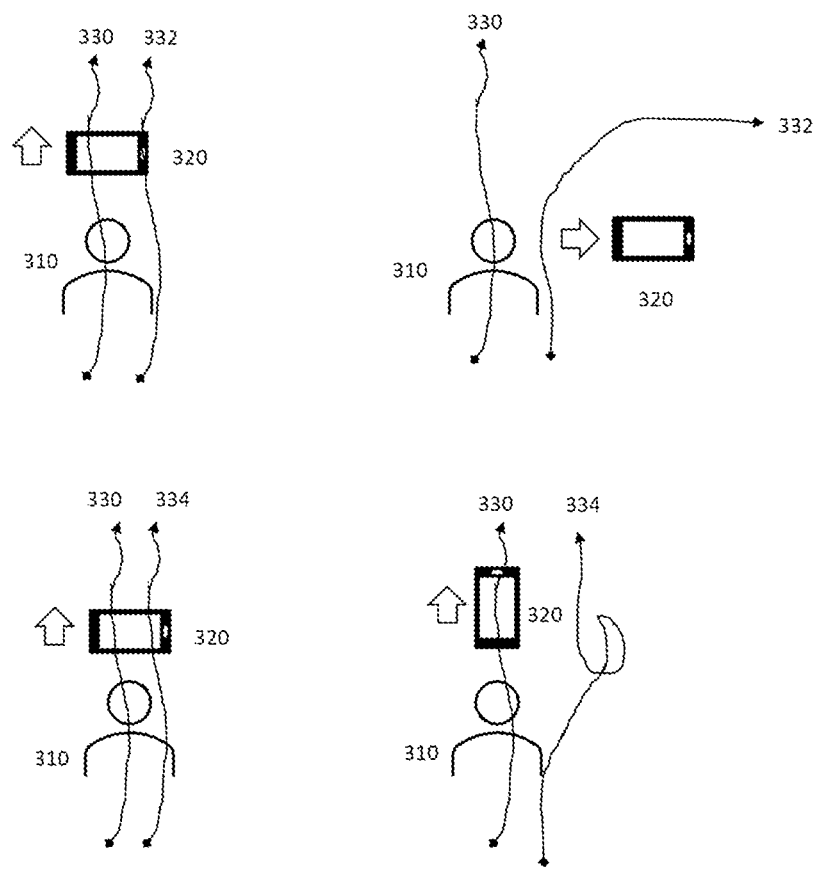
FIGS. 3A and 3B illustrate another exemplary embodiment of determining orientation for visual content to be rendered.
Figure 3B:
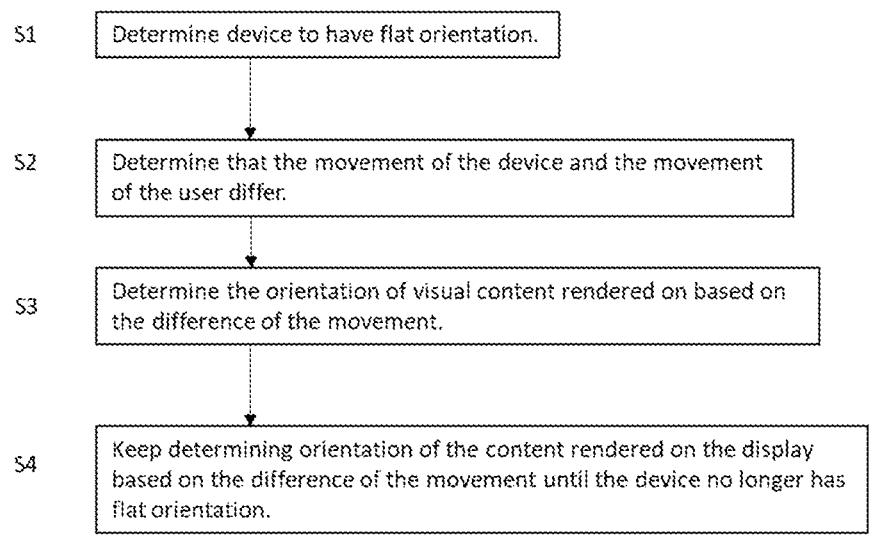

FIGS. 3A and 3B illustrate yet another exemplary embodiment of determining an optimal orientation of visual content rendered on a display of a mobile device. In the exemplary embodiment of FIG. 3A a user 310 moves such that his movement differs from the movement of a mobile device 320. In this exemplary embodiment, the movement of the mobile device 320 is detected using at least an accelerometer. The movement of the user 310 is determined based on input from one or more of the following: earbuds, smart glasses, virtual reality (VR) glasses, augmented reality (AR)

glasses and/or health tracking wearables etc. with accelerometers or other sensors. In this exemplary embodiment, it is determined that as the movement of the user 310 and the movement of the mobile device 320 differ, the context of the mobile device may be one of the following: the user 310 moved the mobile device 320 away from him, the user 310 rotated the mobile device 320 or the user 310 rotated his head. Yet, in these options the context of the mobile device 320 is such that the mobile device 320 is involved in an activity of the user 310. In this exemplary embodiment, it is also determined that the orientation of the mobile device 320 is a flat orientation.

The difference determined between the movement of the user 310 and the movement of the mobile device 320 may result in various orientations of visual content rendered on the display of the mobile device 320 to be considered as an optimal rotation. For example, if the movement 332 of the mobile device 320 is towards right of the trajectory of the movement 330 of the user, then the orientation of the visual content rendered on the display of the mobile device 320 is rotated clockwise. Alternatively, if the movement of the mobile device 320 is towards left of the trajectory of the movement 330 of the user, then the orientation of the visual content rendered on the display of the mobile device 320 is rotated counter-clockwise.

On the other hand, if the movement 334 of the mobile device 320 differs significantly of the movement of the user 310, for example the mobile device 320 has clockwise rotation of 90° while the user 310 has no rotation, then the orientation of the visual content rendered on the display of the mobile device 320 is rotated counter-clockwise for example by 90°. Further, if the user 310 rotates the mobile device 320, but the user 310 does not rotate, then the visual content rendered on the display of the mobile device 320 may rotated opposite to the rotation of the mobile device 320. On the other hand, if the user 310 rotates his head, but the mobile device 320 then the visual content rendered on the display of the mobile device 320 is not rotated.

FIG. 3B illustrates a flow chart according to the exemplary embodiment of FIG. 3A. In S1, it is determined that an orientation of a mobile device is a flat orientation. Next, in S2 the context of the mobile device is determined. In this exemplary embodiment the context is such that the mobile device is involved in an activity of the user as the movement of the mobile device and the movement of the user are determined. Based on a difference between the movement of the user and the movement of the terminal device, in S3 an orientation of visual content rendered on the display of the mobile device is then determined. In S4, it is continued to determine the orientation of the visual content to be rendered on the display of the mobile device based on the difference between the movement of the user and the movement of the mobile device until it is determined that the orientation of the mobile device is no longer a flat orientation.

Figure 4A:
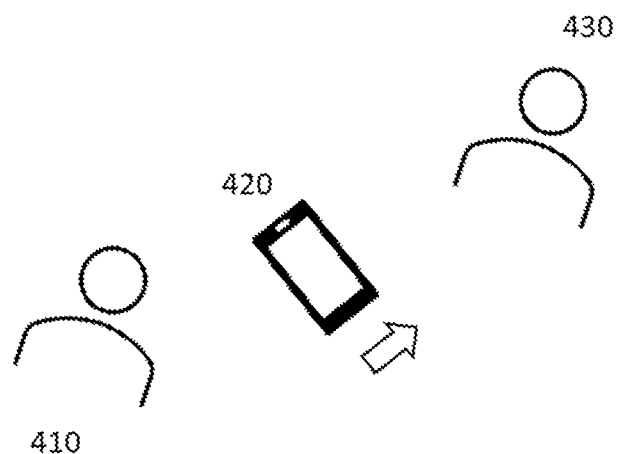
FIGS. 4A and 4B illustrate another exemplary embodiment of determining orientation for visual content to be rendered.
Figure 4B:
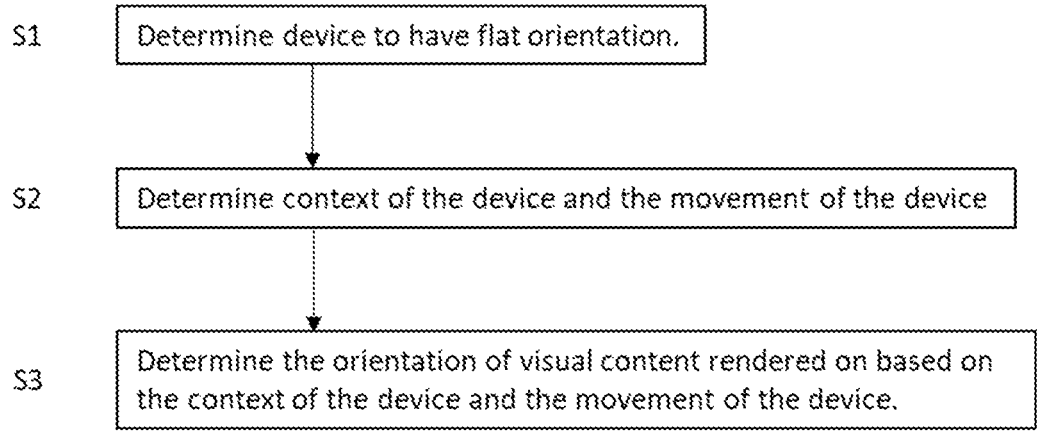

FIGS. 4A and 4B illustrate another exemplary embodiment in which the orientation of the visual content rendered on a display of a mobile device 420 is determined. In the exemplary embodiment of FIG. 4A, the context of the mobile device 420 is such that the mobile device 420 is involved in an activity of a user 410. In this exemplary embodiment, an orientation of the mobile device 420 is determined to be a flat orientation. It is then determined that the context of the mobile device 420 is such that the user 410 moves the mobile device 420. This may be for example the case when the user 410 gives the mobile device 420 to another user 430. As the mobile device 420 determines the context, which in this exemplary embodiment is such that the user 410 gives the mobile device 420 to another user 430, the orientation of the visual content rendered on the display of the mobile device 420 is determined to be fixed, in other words, not rotated, or alternatively, the orientation is rotated 180°. In this manner the same user experience is enabled for the other user 430 than to the user 410. If the orientation of the visual content rendered on the display of the mobile device 420 is not rotated, in other words, is kept fixed, the other user 430 is provided with the same user experience than the user 410. The user experience may be dependent on for example speaker locations on the mobile device 420 with respect to the display of the mobile device 420. Further, in this manner the user 410 can be sure that the other user 430 is provided with the same user experience as the user 410 did by just looking if the other user 430 is holding the device the same way as the user 410 did. On the other hand, if the orientation is rotated such that the rotation is limited to 180°, a benefit of portrait or landscape rotation does not disturb the user experience may be achieved.

The context of the mobile device 420 may be determined in various manners. For example, the mobile device 420 may detect that the user 410 is giving the mobile device 420 to the other user 430 by recognizing a sequence of events in which the face of the user 410 is first detected using a camera comprised in the mobile device 420 and wherein the camera is on the same side as the display of the mobile device 420, after which movement of the mobile device 420 is determined based on input received from one or more accelerometers and then a face of the user 430 is detected using the camera. Once the movement of the mobile device 420 is completed, or during the movement of the mobile device 420, the visual content rendered on the display for the mobile device 420 may be rotated back to the same rotation it had when it was viewed by the user 410 or, alternatively, rotation may be disabled, if the face of the user 410 is not recognized from the image obtained from the camera.

Alternatively or additionally, the context of the mobile device 420 may be determined based on its distance to other devices such as wearable devices worn by the users 410 and 430. For example, if the user 410 wears a smart watch and the user 430 has headphones that are paired with the mobile device 420, the mobile device 420 may detect its movement based on the changing distances to the wearable devices. For example, the mobile device 420 may detect that it is moving further away from the smart watch and closer to the headphones. If it is further determined that the orientation of the mobile device 420 is a flat orientation, then the orientation of the visual content rendered on the display of the mobile device 420 may further be determined based on the context of the mobile device 420 and the movement of the mobile device 420.

FIG. 4B illustrates a flow chart according to the exemplary embodiment of FIG. 4A. First, in S1, it is determined that an orientation of the mobile device is a flat orientation. Then in S2 the context of the mobile device is determined. In this exemplary embodiment the context is an activity of a user in which the mobile device is involved. The user in this exemplary embodiment passes the mobile device to another user. The mobile device also determines its movement. Then, in S3, based on the context of the mobile device and the movement of the mobile device, the orientation of visual content rendered on the display of the mobile device is determined and the visual content is rendered accordingly.

Figure 5A:
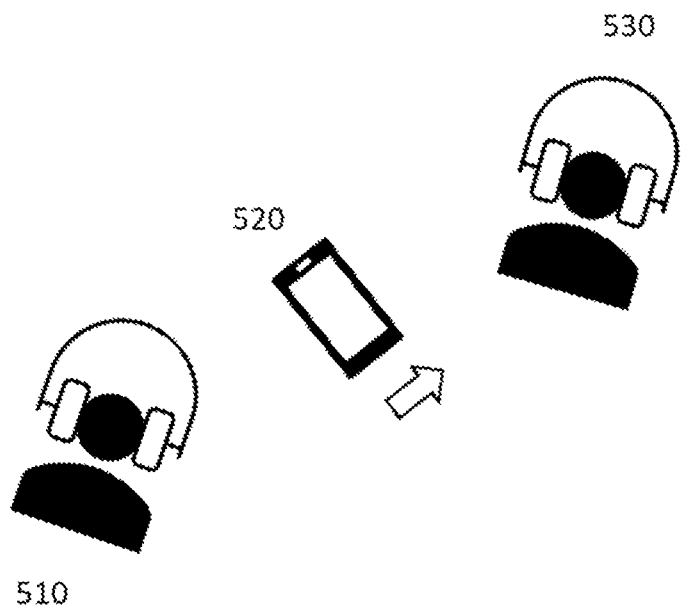
FIGS. 5A and 5B illustrate another exemplary embodiment of determining orientation for visual content to be rendered.
Figure 5B:
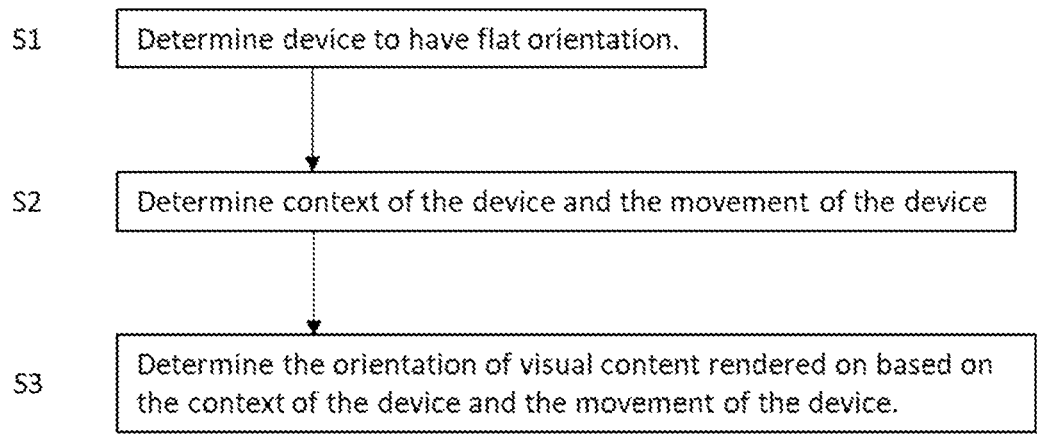

FIGS. 5A and 5B illustrate yet another exemplary embodiment in which orientation of visual content rendered on a display of a mobile device is determined. In the exemplary embodiment of FIG. 5A, a user 510 passes the mobile device 520 to a user 530. The user 510 is wearing headphones that are paired with the mobile device 520 and the user 530 is also wearing headphones that are paired with the mobile device 520. The mobile device 520 determines that its orientation is flat. The mobile device 520 then determines that its context is that it has at least one active connection to another device, that is, to the headphones. The mobile device 520 also determines that its movement is towards a device to which it has an active connection. At the end of the movement, the mobile device 520 determines a direction in which the closest device, to which it has an active connection to is. Based on this direction, the orientation of the visual content to be rendered on the display of the mobile device 520 is determined and rendered accordingly. Additionally, the mobile device may restrict rotation of the orientation to 180° angles to keep the user experience the same instead of switching between landscape and portrait.

The determining of the closest device to which the mobile device 520 has an active connection to may be achieved in various manners. For example, Ultra Wide Band (UWB) or Bluetooth LE may be utilized determine the closest device based on signal strength and also its direction when Bluetooth LE antenna array is used. It is to be noted that the mobile device 520 may have multiple active connections to other devices at the same time. These multiple connections may be for example between the mobile device 520 and different wearable devices, such as earbuds, heart rate meters and/or electrocardiogram (EKG) meters.

FIG. 5B illustrates a flow chart according to the exemplary embodiment of FIG. 5A. First, in S1, it is determined that an orientation of the mobile device is a flat orientation. Then in S2 the context of the mobile device is determined. In this exemplary embodiment the context is an active connection to at least one other device. The user in this exemplary embodiment passes the mobile device to another user. The mobile device also determines its movement. Then, in S3, based on the context of the mobile device and the movement of the mobile device, the orientation of visual content rendered on the display of the mobile device is determined and the visual content is rendered accordingly.

Figure 6:
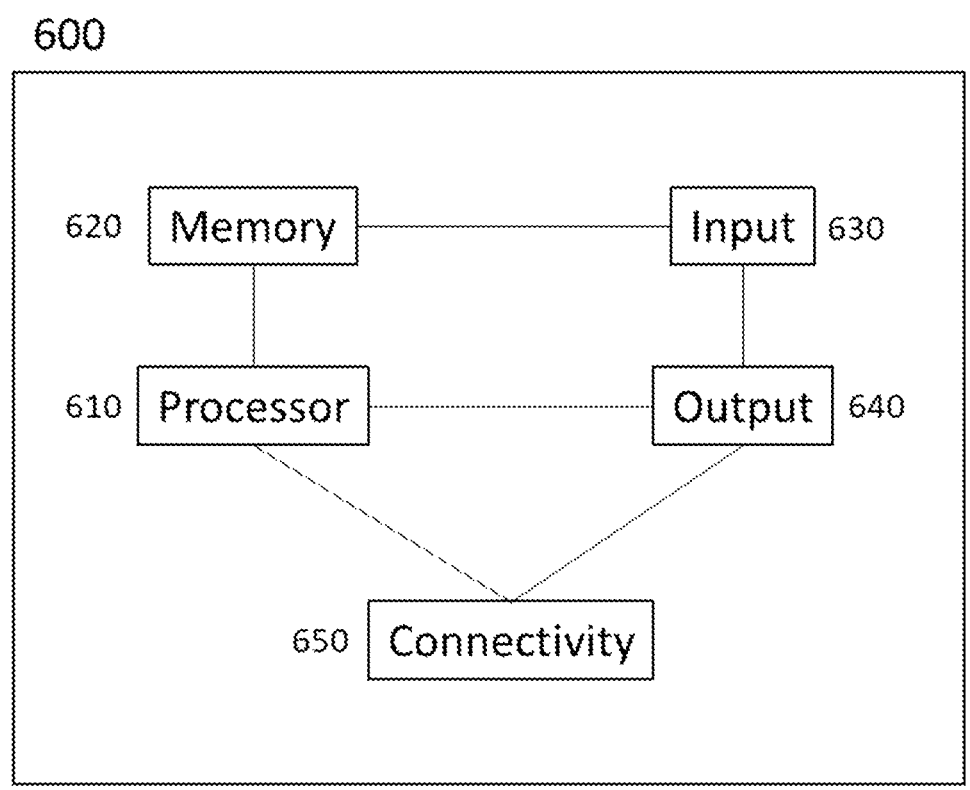
FIG. 6 illustrates an exemplary embodiment of an apparatus.

FIG. 6 illustrates an apparatus 600, which may be a computing apparatus, according to an example embodiment. The apparatus 600 may be, or may be comprised in, a mobile device such as those described in the exemplary embodiments above. The apparatus 600 comprises a processor 610. The processor 610 interprets computer program instructions and process data. The processor 610 may comprise one or more programmable processors. The processor 610 may comprise programmable hardware with embedded firmware and may, alternatively or additionally, comprise one or more application specific integrated circuits, ASICs.

The processor 610 is coupled to a memory 620. The processor is configured to read and write data to and from the memory 620. The memory 620 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 620 stores computer readable instructions that are execute by the processor 610. For example, non-volatile memory stores the computer readable instructions and the processor 610 executes the instructions using volatile memory for temporary storage of data and/or instructions.

The computer readable instructions may have been pre-stored to the memory 620 or, alternatively or additionally, they may be received, by the apparatus, via electromagnetic carrier signal and/or may be copied from a physical entity such as computer program product. Execution of the computer readable instructions causes the apparatus 600 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 600 further comprises, or is connected to, an input unit 630. The input unit 630 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 630 may comprise an interface to which external devices may connect to.

The apparatus 600 also comprises an output unit 640. The output unit comprises or is connected to one or more displays capable of rendering visual content such as a light emitting diode (LED) display, a liquid crystal display (LCD) and/or a liquid crystal on silicon (LCoS) display. The output unit 640 may comprise two displays to render stereoscopic visual content. One display to render content to the left eye and the other display to render content to the right eye. The output unit 640 may further comprise a transmission unit, such as one or more waveguides or one or more lenses, to transfer the rendered visual content to the user's field of view. The output unit 640 may further comprise one or more audio outputs. The one or more audio outputs may be for example loudspeakers or a set of headphones.

The apparatus 600 may further comprise a connectivity unit 650. The connectivity unit 650 enables wired and/or wireless connectivity to external networks. The connectivity unit 650 may comprise one or more antennas and one or more receivers that may be integrated to the apparatus 600 or the apparatus 600 may be connected to. The connectivity unit 650 may comprise an integrated circuit or a set of integrated circuits that provide the wireless communication capability for the apparatus 600. Alternatively, the wireless connectivity may be a hardwired application specific integrated circuit (ASIC).

It is to be noted that the apparatus 600 may further comprise various components not illustrated in the FIG. 6. The various components may be hardware component and/or software components.

Example embodiments described herein may be implemented using software, hardware, application logic or a combination of them. Also, if desired, different functionalities discussed herein may be performed in a different order, some functionalities may be performed concurrently, and, if desired, some of the above-mentioned functionalities may be combined. Although various aspects of the invention are set out in the independent claims, other aspects of the invention comprise other combinations of features from the described embodiments and/or dependent claims with features of the independent claims and not solely the combinations explicitly set out in the claims.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus comprising:
   at least one processor; and
   at least one non-transitory memory including computer program code, the at least one memory and the computer program code configured to, with the at least one processor, cause the apparatus at least to:
      determine that an orientation of a mobile device is a flat orientation;
      determine a context of the mobile device, comprising, at least, causing the apparatus to:
         determine movement of a user; and
         determine a difference between a movement of the mobile device and the movement of the user;
      determine the movement of the mobile device; and
      based on the orientation, context and movement of the device, determine an orientation of a visual content rendered on a display of the mobile device.

2. The apparatus according to claim 1, wherein the determining of the context further comprises the at least one memory and the computer program code are configured to, with the at least one processor, cause the apparatus to:
   determine that an application of the mobile device is activated.

3. The apparatus according to claim 1, wherein the determining of the context of the mobile device further comprises the at least one memory and the computer program code are configured to, with the at least one processor, cause the apparatus to:
   determine an activity of a user.

4. The apparatus according to claim 1, wherein the determining of the context of the mobile device further comprises the at least one memory and the computer program code are configured to, with the at least one processor, cause the apparatus to:
   determine that the mobile device has an active connection to one or more adjacent devices.

5. The apparatus according to claim 4, wherein the determining of the context of the mobile device further comprises the at least one memory and the computer program code are configured to, with the at least one processor, cause the apparatus to:
   determine a distance between the mobile device and the one or more adjacent devices.

6. The apparatus according to claim 1, wherein the determining of the orientation of the visual content rendered on the display of the mobile device further comprises the at least one memory and the computer program code are configured to, with the at least one processor, cause the apparatus to:
   orient the visual content rendered on the display of the mobile device such that it is aligned with a direction of the movement of the mobile device.

7. The apparatus according to claim 1, wherein the determining of the orientation of the visual content rendered on the display of the mobile device further comprises the at least one memory and the computer program code are configured to, with the at least one processor, cause the apparatus to:
   determine that the orientation of the visual content rendered on the display of the mobile device is to be rotated 90 or 180 degrees.

8. The apparatus according to claim 1, wherein the at least one memory and the computer program code are further configured to, with the at least one processor, cause the apparatus to:
   keep the determined orientation of the visual content rendered on the display of the mobile device fixed until
      the context is no longer valid and/or
      the orientation of the mobile device is no longer the flat orientation.

9. The apparatus according to claim 1, wherein the apparatus is or is comprised in the mobile device.

10. A method comprising:
    determining that an orientation of a mobile device is a flat orientation;
    determining a context of the mobile device, comprising, at least:
       determining movement of a user; and
       determining a difference between a movement of the mobile device and the movement of the user;
    determining the movement of the mobile device; and
    based on the orientation, context and movement of the device, determining an orientation of visual content rendered on a display of the mobile device.

11. The method according to claim 10, wherein determining the context further comprises:
    determining that an application of the mobile device is activated.

12. The method according to claim 10, wherein determining the context of the mobile device further comprises:
    determining activity of a user.

13. The method according to claim 10, wherein determining the context of the mobile device further comprises:
    determining that the mobile device has an active connection to one or more adjacent devices.

14. The method according to claim 13, wherein determining the context of the mobile device further comprises:
    determining a distance between the mobile device and the one or more adjacent devices.

15. The method according to claim 10, wherein determining the orientation of the visual content rendered on the display of the mobile device further comprises:
    orienting the visual content rendered on the display of the mobile device such that is it aligned with a direction of the movement of the mobile device.

16. A non-transitory computer readable medium comprising program instructions stored thereon for performing at least the following:
    determining that an orientation of a mobile device is a flat orientation;
    determining a context of the mobile device, comprising, at least:
       determining movement of a user; and
       determining a difference between a movement of the mobile device and the movement of the user;
    determining the movement of the mobile device; and
    based on the orientation, context and movement of the device, determining an orientation of visual content rendered on a display of the mobile device.

* * * * *